United States Patent Office 3,020,709
Patented Feb. 13, 1962

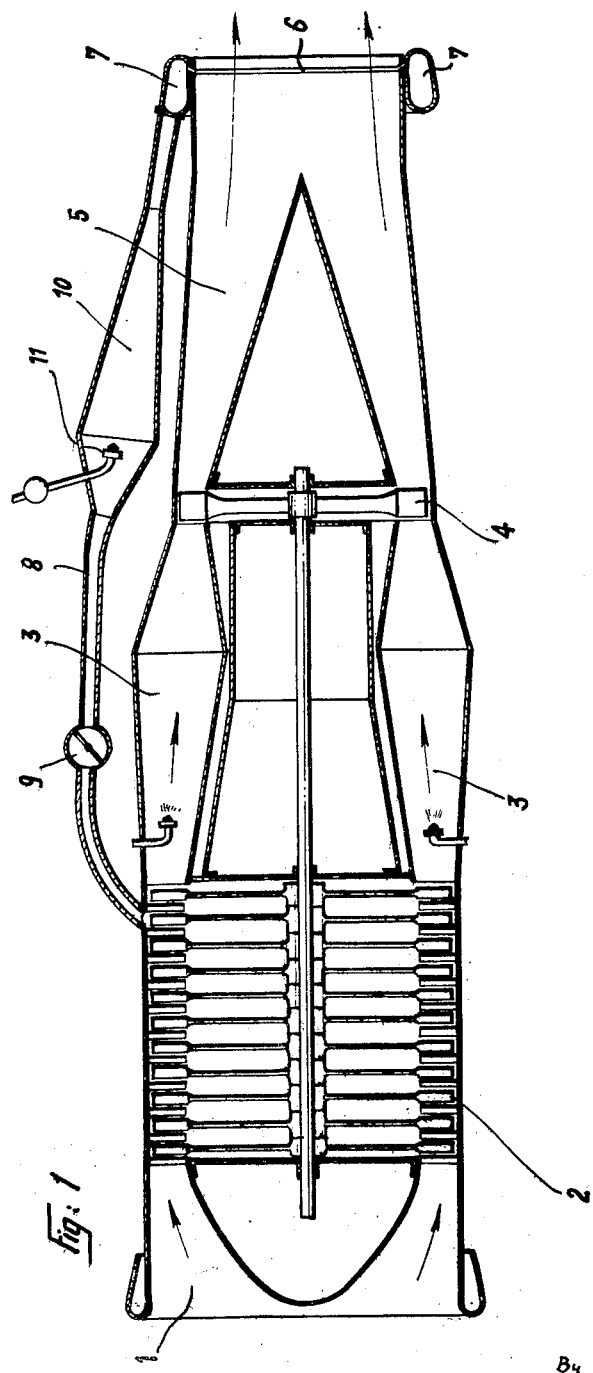

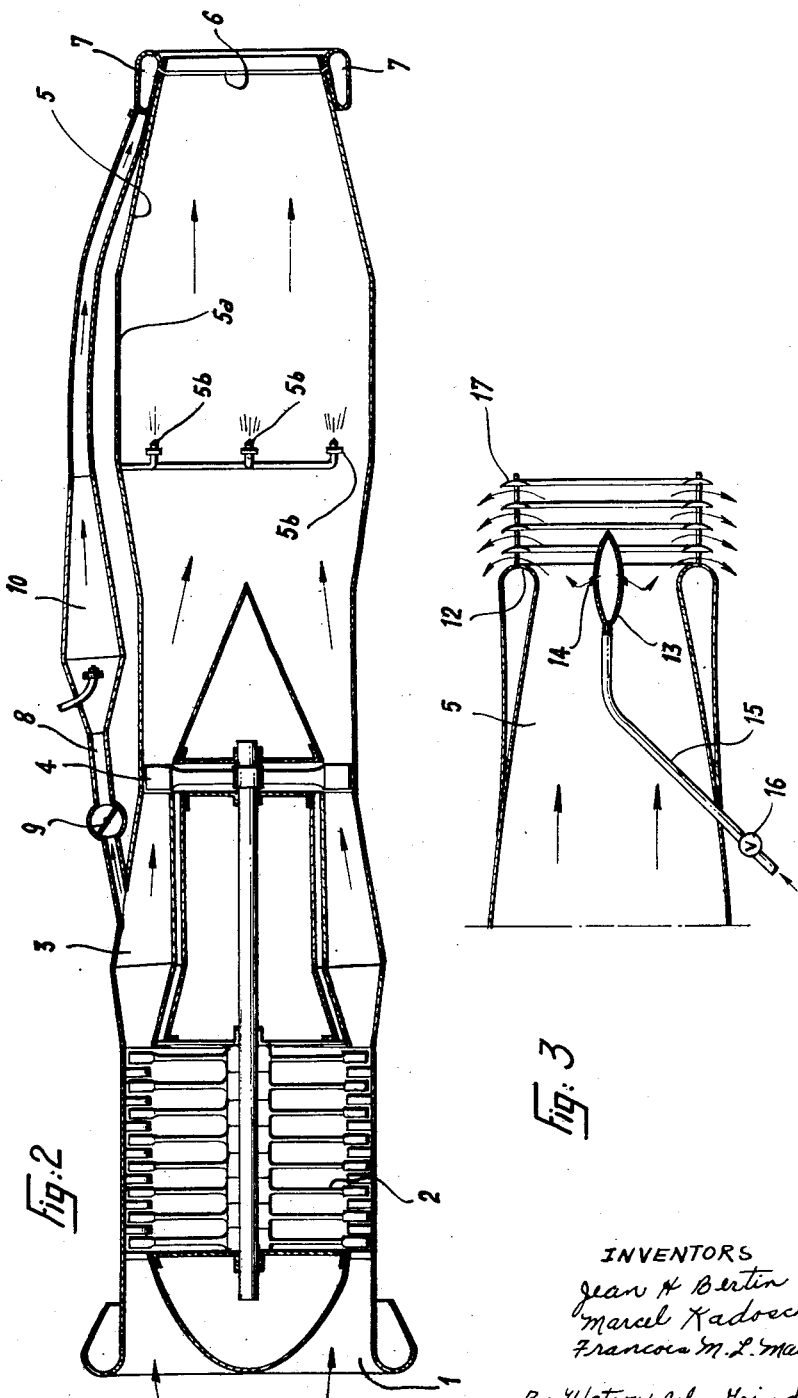

3,020,709
CONTROL MEANS OF THE FLOW OF A
FLUID BY ANOTHER FLOW
Jean H. Bertin, Neuilly-sur-Seine, and Marcel Kadosch
and François M. L. Maunoury, Paris, France, assignors to Societe Nationale d'Etude et de Construction
de Moteurs d'Aviation, Paris, France, a French company
Filed May 15, 1953, Ser. No. 355,354
Claims priority, application France May 21, 1952
5 Claims. (Cl. 60—35.6)

A method of acting upon a fluid flowing in a discharge nozzle by means of an auxiliary current of fluid suitably directed so as to exert a throttling effect upon the nozzle.

Thus, in the U.S. patent application, Serial No. 263,666, filed December 27, 1951 is described a method of and means for varying the effective area of the propulsive nozzle of a jet propulsion engine, comprising fluid-injecting means opening into said nozzle and extending through a wall of said nozzle over at least a portion of a peripheral zone thereof for forming a screen-like fluid jet issuing into said nozzle in a direction which is generally perpendicular to the axis of said nozzle or inclined upstream with respect to a plane perpendicular to said axis.

On the other hand, in the U.S. patent applications, Serial No. 108,758, filed August 5, 1949 now Patent No. 2,702,986, Serial No. 268,016, filed January 24, 1952 now Patent No. 2,738,646, and Serial No. 229,772, filed June 4, 1951 now Patent No. 2,793,494 is described a method of and means for deflecting a fluid jet from its normal direction of flow through a discharge nozzle, which is particularly useful in the case of jet propulsion units in order to obtain a variation in the thrust, or even a counter-thrust to give a braking effect. In certain embodiments, this deflection is obtained by the blowing action of an auxiliary jet which forces the main jet to be deflected against a convex divergent and tangential extension of the discharge nozzle.

The present invention has for its object improvements in these methods of control of flow of a fluid by means of an auxiliary fluid jet and also in the means of carrying the said method into effect. In addition, it includes certain applications with their own special features.

As far as the method first referred to is concerned, theory and experience have shown that the effect of contraction obtained upon a flow by the component perpendicular to that flow and derived from an auxiliary jet, depends on the momentum of this jet, that is to say on the product of its mass flow and its speed of injection, which it is desirable to make as high as possible.

As for the second method referred to above, the deflection effect in this case also depends on the momentum of the auxiliary jet forming the deflecting obstacle.

In accordance with the invention, the auxiliary fluid under pressure, generally a gaseous fluid, is heated by any particular appropriate means before it expands through a nozzle. This heating allows the energy of the flow to be considerably increased and, in consequence, its velocity. In particular, in order to obtain any given contraction or deflection effect, the required mass of auxiliary gas will be smaller as the gas is more strongly heated. In other words, for a predetermined momentum of the auxiliary gas jet, the mass flow thereof tapped from a source of pressure gas will be decreased as this auxiliary gas is heated.

In the following description and subjoined claims, the term "specific momentum" will designate the ratio of the momentum of the auxiliary gaseous jet to the mass flow of auxiliary gas tapped from the source of pressure gas.

The main object of the invention is to provide means for increasing this specific momentum or—what amounts to the same—reducing the mass flow tapped from the pressure source, for a given momentum of the auxiliary jet.

In an alternative arrangement, an increase in the specific momentum of the auxiliary gas is obtained by injecting into the gas a liquid such as water.

This liquid may be vary finely sprayed into the centre of the auxiliary gas or vaporized in this gas by using the heat of the gas. This heat is sufficient if the auxiliary gas, into which the water is injected, is constituted by air taken from the compressor of the jet propulsion unit. Alternatively, a liquid may be chosen which has a low boiling point such as methanol.

The two methods: injection of liquid and heating may also be used in combination.

The description which follows below in respect of the attached drawings (which are given by way of example only and not in any sense by way of limitation) will make it quite clear how the invention may be carried into effect.

FIG. 1 is a diagrammatic axial section of a turbo-jet unit provided with an improved arrangement in accordance with the invention.

FIG. 2 is a view similar to FIGURE 1 of a turbo-jet unit provided with an after-burning device and comprising an application of the invention to the control of the outlet area of the propulsive nozzle.

FIG. 3 is a fragmentary view of a jet propulsive nozzle comprising an application of the invention to the deflection of the jet.

In FIG. 1 there is shown a turbo-jet unit comprising a front air inlet orifice 1, the multiple-stage air compressor 2, the combustion chamber 3, the gas turbine 4 driven by the discharge from these chambers and driving the compressor 2, and lastly the discharge nozzle 5.

Towards the extremity of its wall, the discharge nozzle comprises a peripheral blowing slot 6 which communicates with an annular chamber 7 which may be supplied from a source of gas under pressure. In the example shown in the drawing, this source is the compressor 2, of which a suitable stage is connected to the chamber 7 by a pipe 8 provided with a stop-valve 9.

When this valve is closed, the slot 6 is not in operation (it is thin enough not to disturb the flow of the jet) and the full area of discharge of the nozzle 8 is available for the jet.

When, on the other hand, the valve 9 is open, the air arriving from the compressor is fed into the chamber 7 and escapes into the discharge nozzle thus forming a kind of annular gaseous screen which throttles the jet by thus diminishing the effective cross-sectional area of the discharge nozzle, this reducing effect being variable by opening the valve 9 to a greater or smaller extent. The slot 6 is located in such a manner that the auxiliary jet which passes through it coming from the chamber 7 has a large component of speed perpendicular to the direction of the main flow. In the drawing, the slot has been shown as slightly inclined towards the front of the unit. It could be perpendicular to the axis of the unit or even slightly inclined towards the rear.

Naturally, the source of pressure which supplies the tube 8 must be such as to supply at the outlet of the slot 6 a total pressure which is higher than the static pressure, at this point, of the jet which flows in the discharge nozzle 5.

When the compressor of the turbo-jet unit is employed, there is no difficulty in obtaining this condition since the slot 6 is located at the outlet end of the unit, i.e. in a zone in which the motive gases are at or very near atmospheric pressure, since they have expanded through the turbine 4 and nozzle 5 and issue into the atmosphere.

A combustion chamber 10 is interposed in the path of the air proceeding from the tube 8 to the chamber 7.

This combustion chamber, which is provided with a fuel injection device 11 at the nose of which the fuel may be ignited at any desired moment, after having opened the valve 9, enables the gases to be discharged under pressure at high temperature into the chamber 7, thus increasing the energy of the auxiliary jet blown through the slot 6 and, in consequence, the speed of expansion of this jet. For a given momentum, there is thus here a means of considerably reducing the mass flow of air tapped from the compressor by the piping system 8, and therefore of increasing the specific momentum. This is an advantage in that the quantity of air abstracted from the motive cycle of the unit is reduced, whilst it gives to the auxiliary jet passing through the slot 6, sufficient energy to enable the desired reduction of area of the main jet to be carried out.

The auxiliary flow heating device 10–11 may be replaced by a spray injector (of water or any other liquid under pressure). The water will be dispersed in the air and will be vaporized due to the fact that the air, taken from the compressor of the unit, is already relatively hot. In this way, the momentum of the fluid blown through the slot 6 is increased by increasing its mass flow (the slot 6 should obviously have a suitable area) without increasing the mass flow tapped from the compressor.

Of course, both the velocity and the mass flow of the auxiliary gas may be increased in two different ways by retaining the burner 11 together with the spray injector.

In FIG. 3, the control of the area of a propulsive nozzle by an auxiliary throttling jet is applied to a jet propulsion unit with an after-burning device.

The general lay-out of the arrangement is similar to that of FIG. 1, but the discharge nozzle 5 comprises an enlarged portion 5a in which are arranged a certain number of burners 5b which are supplied with fuel when a supplementary thrust is momentarily desired. The enlarged portion 5a constitutes a diffuser which slows down the gases discharged from the turbine 4, so as to give them a speed low enough for the correct operation of the burners 5b. The combustion at the tips of the burners increases the energy of the gases which are then expanded in the final portion of the discharge nozzle 5. As the outlet area of a well-designed discharge nozzle should be roughly proportional to the square root of the temperature of the gases to be discharged, it will be seen that in a unit of the type shown in FIG. 2, the area of the outlet orifice of the discharge nozzle 5 must vary to a fairly considerable extent depending on whether or not the burners 5b are in operation.

In the embodiment illustrated, the physical cross-sectional area of the outlet orifice is chosen in such a way as to be large enough for the discharge of the gases when they are heated by the burners 5b. As this area is then too great when these burners are not in use, that is to say when starting up or at cruising speed, this section is reduced by opening the valve 9 so as to supply the slot 6. In this way there is obtained a method of control of an after-burning discharge nozzle without complicated mechanical arrangements.

The use of a gas at high temperature to feed through the slot 6 enables the mass flow of this gas to be reduced which, in the case considered, is an important advantage, having regard to the time during which the gas may be employed. In the example shown in the drawing, the gases supplying the slot 6 are taken from the combustion chamber 3 of the reaction unit. They are thus already very hot and a combustion chamber 10 inserted in the pipe 8 enables their temperature to be still further increased when its burner is ignited.

The variation of the cross-sectional area of the discharge nozzle obtained in accordance with the invention may be progressive, so as to adapt the outlet area of the discharge tube to the output of the jet passing through this area, as in the case of the known types of discharge nozzle provided with a mechanical device for varying the cross-sectional area. In fact, the tap, the valve or similar member 9 mounted in the pipe system which conducts the flow of auxiliary fluid to the slot 6 enables the flow of this fluid to be regulated and, in consequence, the momentum and thus finally its action on the jet passing through the discharge nozzle.

The quantity of fuel burnt in the combustion chamber 10 (FIG. 1) may also be modified as may also the quantity of liquid injected into the auxiliary gas.

In the case of an after-burning discharge nozzle, if the physical area of the outlet of the discharge nozzle is calculated for an after-burning the maximum quantity of fuel, the said valve will be closed for this maximum after-burning, thus making available the full area of the outlet. On the other hand, it will be fully opened when the after-burners are extinguished. Finally, in the case of an intermediate condition of the after-burning, the valve will be partly opened in order to provide only that flow of air which corresponds to the desired change in the cross-sectional area of the outlet orifice.

The valve also enables the outlet area of the discharge nozzle to be varied for other purposes than that of adaptation to after-burning, for example for starting the unit or for varying the thrust without after-burning.

In the case of a nozzle provided with a device for deflecting the propulsive jet, comprising a series of vanes arranged laterally of the normal path of the jet and adapted to guide the latter when its deflection has been initiated, the tap may be left slightly opened at maximum after-burning rate, so that the slight flow of gas produced will sufficiently constrict the cross-section of the jet for the latter to avoid the series of vanes.

The variation of the specific momentum of the auxiliary fluid may also be obtained in other ways. For example, in the case in which a liquid is injected into this fluid, the quantity of liquid injected may be regulated between zero and a maximum.

In the embodiment shown in FIG. 3, the invention is applied to the deflection of a flow by a fluid obstacle.

In FIG. 3, there is shown at 5 a reaction discharge nozzle of circular form, which terminates in a convex extension 12 tangentially joined to the internal wall of the said discharge nozzle. On the axis of this latter, there is arranged a hollow streamlined body 13, also circular in section, which is provided with an annular slot 14 in the vicinity of the plane of the junction of the extension 12 and the internal wall of the discharge nozzle. The interior of the hollow body 13 can be supplied with gas under pressure by a tube 15 provided with a control valve 16. When this valve 16 is open, the gases under pressure pass into the hollow body 13 and thence through the annular slot 14 and this slot is arranged in such a way that the gas which discharges through it has a substantial component of velocity perpendicular to the velocity of the jet which passes through the discharge nozzle 5. The gaseous jet discharged from the slot 14 thus forms an obstacle to the flow of the main jet and this latter is deflected along the convex edge 12 which reduces the thrust or can even produce a negative thrust. Fins or blades 17, suitably curved, assist the deflection of the whole of the jet as soon as this deflection is initiated by the gas flowing out of the slot 14. For the reasons which have already been given above, it is an advantage to supply the pipe 15 and the streamlined body 13 with a gas at high temperature which can be taken from the combustion chamber of the reaction unit or which may be heated by a special combustion chamber arranged in the pipe 15 as in the example shown in FIG. 1. A liquid may also be injected into the auxiliary gas, as referred to above.

It will be appreciated, of course, that the heating of the auxiliary jet may be carried out by means other than those described and that, the slot 6 for injection of the auxiliary fluid, may be replaced by other systems of orifices.

What we claim is:

1. In a turbojet unit having, in series flow arrangement, an air compressor, a combustion chamber, a turbine and a propulsive nozzle designed for forming the thrust-producing jet of said unit, a jet control device comprising auxiliary nozzle means opening into the propulsive nozzle at the discharge and thereof and substantially inclined with respect to the axis of said propulsive nozzle, piping means for tapping pressure gas from a point of said unit upstream of said turbine and downstream of at least a part of said compressor and supplying said pressure gas to said auxiliary nozzle means to be expanded therethrough and form an auxiliary jet generally crosswise of the thrust-producing jet, valve means in said piping means, and means associated with said piping means for increasing the specific momentum of the flow of pressure gas therethrough.

2. In a turbojet unit having, in series flow arrangement, an air compressor, a combustion chamber, a turbine and a propulsive nozzle designed for forming the thrust-producing jet of said unit, a device for varying the effective area of said propulsive nozzle comprising auxiliary nozzle means opening into the propulsive nozzle at the discharge end thereof and substantially inclined with respect to the axis of said propulsive nozzle, piping means for tapping pressure gas from a point of said unit upstream of said turbine and downstream of at least a part of said compressor and supplying said pressure gas to said auxiliary nozzle means to be expanded therethrough and form an auxiliary jet generally crosswise of the thrust-producing jet, valve means in said piping means, and means associated with said piping means for increasing the specific momentum of the flow of pressure gas therethrough.

3. In a turbojet unit having, in series flow arrangement, an air compressor, a combustion chamber, a turbine and a propulsive nozzle designed for forming the thrust-producing jet of said unit, a jet deflecting device comprising auxiliary nozzle means opening into the propulsive nozzle at the discharge end thereof and substantially inclined with respect to the axis of said propulsive nozzle, piping means for tapping pressure gas from a point of said unit upstream of said turbine and downstream of at least a part of said compressor and supplying said pressure gas to said auxiliary nozzle means to be expanded therethrough and form an auxiliary jet generally crosswise of the thrust-producing jet, valve means in said piping means, and means associated with said piping means for increasing the specific momentum of the flow of pressure gas therethrough.

4. In a turbojet unit having, in series flow arrangement, an air compressor, a combustion chamber, a turbine and a propulsive nozzle designed for forming the thrust-producing jet of said unit, a jet control device comprising auxiliary nozzle means opening into the propulsive nozzle at the discharge end thereof and substantially inclined with respect to the axis of said propulsive nozzle, piping means for tapping pressure gas from a point of said unit upstream of said turbine and downstream of at least a part of said compressor and supplying said pressure gas to said auxiliary nozzle means to be expanded therethrough and form an auxiliary jet generally crosswise of the thrust-producing jet, valve means in said piping means, an auxiliary combustion chamber in said piping means downstream of said valve means, and means for injecting fuel into said auxiliary combustion chamber to be burnt therein to increase the flow velocity through said piping means.

5. In a turbojet unit having, in series flow arrangement, an air compressor, a combustion chamber, a turbine and a propulsive nozzle designed for forming the thrust-producing jet of said unit, a jet control device comprising auxiliary nozzle means opening into the propulsive nozzle at the discharge end thereof and substantially inclined with respect to the axis of said propulsive nozzle, piping means for tapping pressure gas from a point of said unit upstream of said turbine and downstream of at least a part of said compressor and supplying said pressure gas to said auxiliary nozzle means to be expanded therethrough and form an auxiliary jet generally crosswise of the thrust-producing jet, valve means in said piping means, and means for injecting a vaporizable liquid into said piping means to increase the mass flow therethrough.

References Cited in the file of this patent

UNITED STATES PATENTS

| | | |
|---|---|---|
| 1,493,753 | Koleroff | May 13, 1924 |
| 2,419,866 | Wilson | Apr. 29, 1947 |
| 2,510,506 | Lindhagen et al. | June 6, 1950 |
| 2,610,465 | Imbert et al. | Sept. 16, 1952 |
| 2,630,673 | Woll | Mar. 10, 1953 |
| 2,637,164 | Robson et al. | May 5, 1953 |
| 2,651,172 | Kennedy | Sept. 18, 1953 |
| 2,672,726 | Wolf et al. | Mar. 23, 1954 |
| 2,680,948 | Greene | June 15, 1954 |
| 2,681,548 | Kappus | June 22, 1954 |
| 2,682,147 | Ferris | June 29, 1954 |
| 2,692,800 | Nichols et al. | Oct. 26, 1954 |

FOREIGN PATENTS

| | | |
|---|---|---|
| 499,468 | Belgium | Mar. 16, 1951 |
| 617,475 | Great Britain | Feb. 7, 1949 |
| 666,944 | Great Britain | Feb. 20, 1952 |
| 681,378 | Great Britain | Oct. 22, 1952 |

OTHER REFERENCES

"Anti-Bomber Rocket Missiles," by E. F. Chandler, in Aero Digest, April 1950; pages 100–102.